US008832446B2

(12) United States Patent
Koppers

(10) Patent No.: US 8,832,446 B2
(45) Date of Patent: Sep. 9, 2014

(54) SECURE DATA TRANSFER IN AN AUTOMATION NETWORK

(75) Inventor: Joachim Koppers, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 447 days.

(21) Appl. No.: 13/180,343

(22) Filed: Jul. 11, 2011

(65) Prior Publication Data

US 2012/0066503 A1    Mar. 15, 2012

(30) Foreign Application Priority Data

Jul. 9, 2010   (EP) ..................................... 10007119

(51) Int. Cl.
*H04L 9/32*     (2006.01)
*H04L 29/06*    (2006.01)
*G05B 19/418*   (2006.01)

(52) U.S. Cl.
CPC ............... *H04L 63/08* (2013.01); *H04L 63/12* (2013.01); *G05B 19/4186* (2013.01)
USPC ........................................................ 713/176

(58) Field of Classification Search
USPC .................................... 713/176, 3
See application file for complete search history.

(56) References Cited

U.S. PATENT DOCUMENTS

| 7,181,762 | B2 * | 2/2007 | Jerdonek ............................ 726/2 |
| 8,015,597 | B2 * | 9/2011 | Libin et al. ........................ 726/5 |
| 2002/0095569 | A1 * | 7/2002 | Jerdonek ........................ 713/155 |
| 2004/0139329 | A1 * | 7/2004 | Abdallah et al. .............. 713/182 |
| 2004/0168053 | A1 | 8/2004 | Kaszkin et al. |
| 2005/0033702 | A1 * | 2/2005 | Holdsworth .................... 705/67 |
| 2006/0095771 | A1 * | 5/2006 | Appenzeller et al. ......... 713/171 |
| 2009/0204695 | A1 * | 8/2009 | Busgen et al. ................. 709/223 |

FOREIGN PATENT DOCUMENTS

| DE | 10124 800 | 12/2002 |
| EP | 1 403 749 | 3/2004 |
| EP | 2 159 653 | 3/2010 |
| WO | WO 2008/022606 | 2/2008 |

* cited by examiner

*Primary Examiner* — Krisna Lim
(74) *Attorney, Agent, or Firm* — Cozen O'Connor

(57) ABSTRACT

A method for secure data transfer in an automation network wherein the method comprises authenticating a user by a program invocation rights system aided by user data for approving a use of the program invocation by the user, encrypting and signing data by the program invocation, were the data contains the user data. The method also includes transferring the data by a transfer medium from the program invocation to the subassembly, decrypting the data in the subassembly, authenticating the program invocation associated with the subassembly, and authenticating the user by the subassembly rights system aided by the user data.

17 Claims, 2 Drawing Sheets

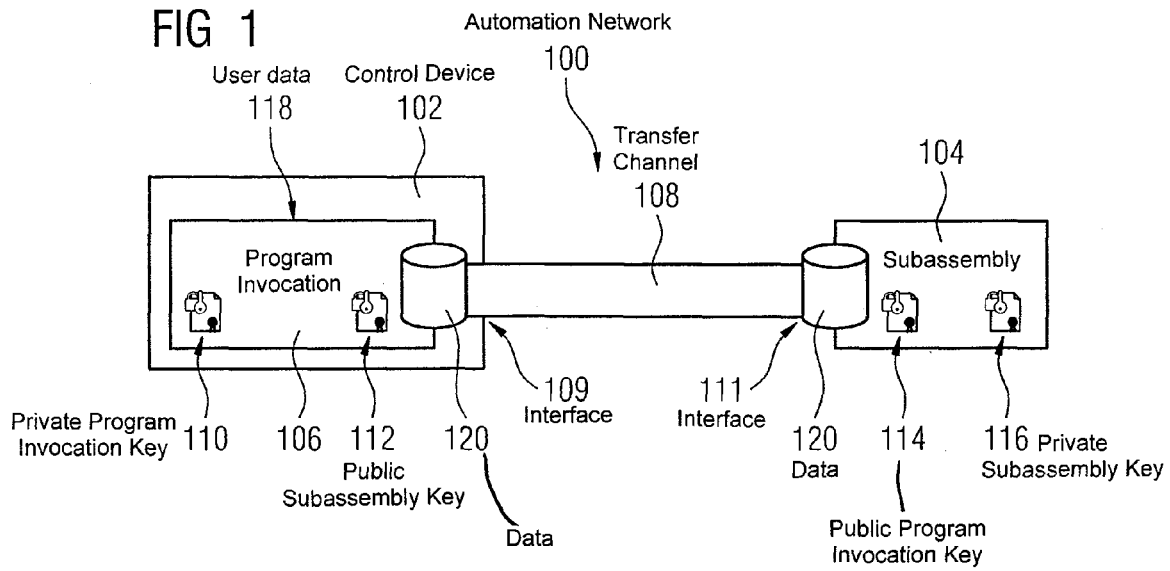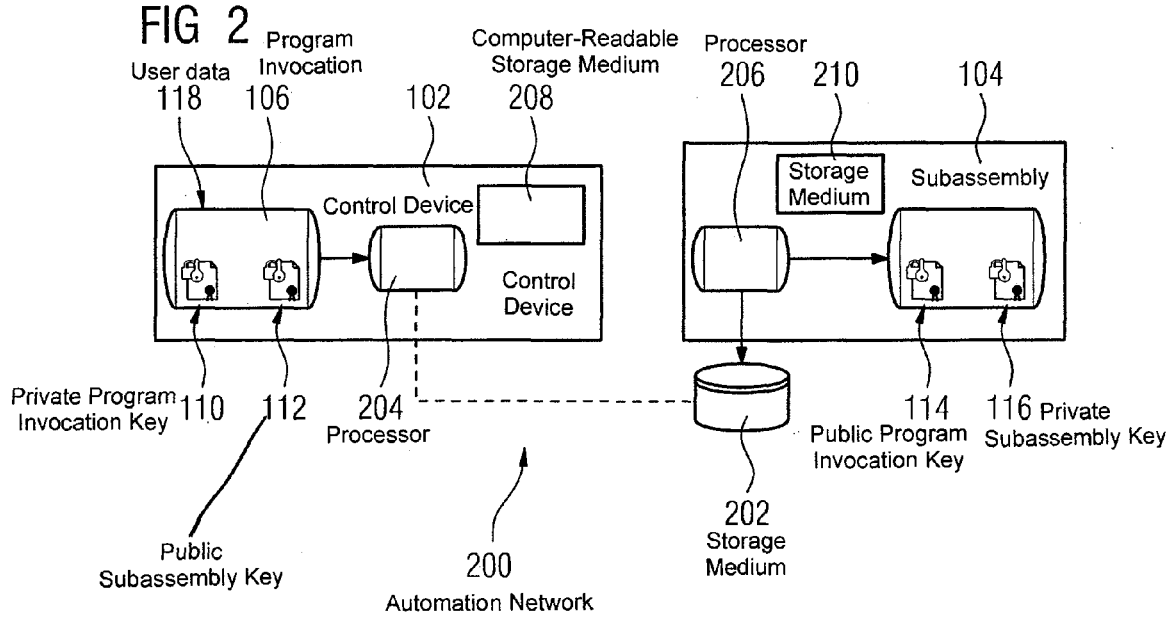

SECURE DATA TRANSFER IN AN AUTOMATION NETWORK

BACKGROUND OF THE INVENTION

1. Field of the Invention

The invention relates to industrial automation networks and, more particularly, to secure data transfer in an industrial automation network.

2. Description of the Related Art

Conventional industrial automation networks normally comprise at least one control device and at least one subassembly. The control device is used to program the subassembly and for this purpose contains a program invocation. The subassembly can, for example, be a machine controller of a machine in a production line. An automation network is used to operate industrial machines or systems autonomously and without the involvement of humans.

Thus data must be transferred from the program invocation to the subassembly, so that the control device can program the subassembly. This data is called configuration data. If the transfer of the configuration data from the program invocation to the subassembly is to be protected so that it is tap-proof and protected against manipulation, a secure transfer protocol such as HTTPS or IPSEC is normally used. Certain security requirements must be met for these transfer protocols, which cannot be met by every automation network or subassembly.

SUMMARY OF THE INVENTION

It is therefore an object of the invention to provide an improved method for secure data transfer in an automation network. It is an additional object of the invention to provide an improved control device and an improved subassembly in an automation network and to create improved storage media for such a subassembly and such a control device.

These and other objects and advantages are achieved in accordance with the invention by a method for secure data transfer in an automation network, where the automation network contains at least one program invocation and at least one subassembly. Here, the security of the data transfer is guaranteed regardless of the transfer method that is used.

In an embodiment, the automation network comprises an industrial automation network. Such industrial automation networks can be configured, set up and/or provided, e.g., for control and/or regulation of industrial systems (e.g., production systems or conveyor systems), machines and/or devices. In particular, automation networks or industrial automation networks can have real-time communication protocols (e.g., Profinet, Profibus, Real-Time Ethernet) for communication at least between the components involved in the control and/or regulation tasks (e.g., between the control units and the systems and/or machines to be controlled). The secure transfer of data by storage media is likewise covered.

Furthermore, however, in addition to a real-time communication protocol, at least one other communication protocol (which, e.g., does not need to be real-time-capable) can be provided in the automation network or industrial automation network, e.g., for monitoring, setting up, reprogramming and/or reparameterizing one or more control units in the automation network.

In an embodiment, the automation network contains wired communication components and/or wireless communication components. Additionally, the automation network contains at least one automation device.

An automation device can be, for example, a computer, PC and/or controller with control tasks or control capabilities. In particular, an automation device can be, for example, an industrial automation device which can be configured, set up and/or provided, e.g., especially for controlling and/or regulating industrial systems. In particular, such automation devices or industrial automation devices can be real-time-capable, i.e., permit control or regulation in real time. To this end, the automation device or the industrial automation device can contain, e.g., a real-time operating system and/or support at least, among other things, one real-time-capable communication protocol for communication (e.g., Profinet, Profibus, Real-Time Ethernet).

In accordance with the contemplated embodiments, the automation network contains a plurality of sensors and actuators. The actuators and sensors are controlled by at least one control device. The actuators, the sensors and the at least one control device exchange data with one another. An automation protocol is used to exchange data. The at least one control device controls the actuators, the sensors and the exchange of data so that an automated production process is executed, in which, e.g., a product is manufactured.

In other embodiment the industrial automation device comprises a programmable logic controller, a module or part of a programmable logic controller, a programmable logic controller integrated into a computer or PC as well as corresponding field devices, sensors and/or actuators, input and/or output devices or similar for connection to a programmable logic controller, or can contain such.

An automation protocol in the context of the presently contemplated embodiments of the invention should be understood to includes every type of protocol provided for, suitable for and/or set up for communication with automation devices according to the present description. Such automation protocols can be standard, for example, the Profi-Bus protocol (e.g., according to International Electrotechnical Commission (IEC) 61158/EN50170), a Profi-Bus-DP protocol, a Profi-Bus-PA protocol, a Profi-Net protocol, a Profi-Net-IO protocol, a protocol according to AS-Interface, a protocol according to IO-Link, a KNX protocol, a protocol according to a Multipoint Interface (MPI), a protocol for a point-to-point (PtP) link, a protocol according to the specifications of S7 communication (which, for example, is provided and set up for communication by programmable logic controllers from Siemens) or also an Industrial Ethernet protocol or Real-Time Ethernet protocol or further specific protocols for communication with automation devices. An automation protocol in the context of the present description can also be any combination of the aforementioned protocols.

The program invocation has a program invocation rights system and the subassembly has a subassembly rights system. The method comprises the following steps. First, a user of the program invocation is authenticated. This is done by the program invocation rights system with the help of user data. The user data can be, for example, a user name and a password, or can also comprise other known methods for authenticating users by program invocation rights systems.

The program invocation rights system is a rights system of the program invocation. The program invocation rights system can thus on the one hand authenticate a user with the help of the user data and on the other hand assign differing rights to different users. It should be noted that it is likewise possible for all authenticated users to be granted all rights.

The subassembly rights system is a rights system of the subassembly. Similarly, the subassembly rights system, can on the one hand, authenticate a user with the help of the user data and, on the other hand, assign differing rights to different users. It should also be noted that it is likewise possible for all authenticated users to be granted all rights.

The data to be transferred is encrypted and signed by the program invocation. For example, the program invocation for this purpose contains a signed Dynamic-Link Library (DLL) file or a signed executable file which is thus protected against manipulation. Preferably, the program invocation is equipped with asymmetric keys for encrypting and signing the data. The data likewise contains the user data. The user data is thus transferred—encrypted and signed—to the subassembly together with the configuration data to be transferred.

The data is decrypted in the subassembly. This is followed by authentication of the program invocation by the corresponding subassembly. This can be done, for example, by the data being signed with an asymmetric private key of the program invocation and this signature being authenticated in the subassembly by a public key of the program invocation. The signature of the data is thus checked in the subassembly. As a result, it is ensured that no manipulation of the data has occurred and the subassembly has received the data only from a program invocation authorized to control the subassembly. As a result of the signature with the private key of the program invocation, no data transfer from the subassembly to the program invocation is necessary, in contrast, e.g., to the so-called challenge-response method. The program invocation is authenticated, without data having to be sent from the subassembly to the program invocation.

The decrypted data contains the user data. The user is authenticated by the subassembly rights system with the help of the user data. Additionally, the user can be authorized to transfer data to the subassembly. This relates to retrospective authorization. If the user is not authorized for data transfer, then the data is rejected. Otherwise, the data is used to control the subassembly. This step ensures that the user logged on to the program invocation is authorized to transfer data to the subassembly. Thus any sort of manipulation of the data is impossible and only data transferred by authorized users of the program invocation to the subassembly is processed in the subassembly. Here, the transfer path is entirely irrelevant, and can thus also involve an insecure transfer channel. Because the data has been encrypted and signed and the user data has been transferred to the subassembly, the data is protected against any kind of manipulation and it is ensured, regardless of the transfer path, that the data cannot be intercepted or manipulated.

The particular security of data transfers in accordance with embodiments of the invention consists in the fact that the user data is transferred encrypted with the configuration data from the program invocation to the subassembly and authentication of the user is performed in the subassembly. In addition to the authentication of the user in the program invocation and to the signed and encrypted data transfer there is an automation network protected against manipulation that offers secure data transfer regardless of the security of the transfer channel. In accordance with the contemplated embodiments of the invention, this involves an asymmetric encryption when encrypting the data.

In accordance with disclosed embodiments of the invention, the program invocation and the subassembly each have an asymmetric public program invocation key and an asymmetric public subassembly key. The program invocation further has a private program invocation key and the subassembly has a private subassembly key. There is thus a key pair both for the program invocation and for the subassembly, which is used for signatures and encryptions. A key pair consists in each case of a public and a private key.

The data is encrypted in the program invocation with the public subassembly key and signed with the private program invocation key. It should be noted that the data likewise contains the user data. The encrypted and signed data transferred from the program invocation to the subassembly is decrypted in the subassembly with the private subassembly key. The authentication of the program invocation as the sender of the data is performed with the public program invocation key. The authentication of the user of the program invocation is performed by evaluating the decrypted data.

In accordance with contemplated embodiments of the invention, the encrypted and signed data can be stored by the program invocation on a storage medium. Before decryption the data in the subassembly is read from the storage medium. The storage medium can, for example, be an optical, magnetic and/or digital storage medium. The storage medium can likewise be a rotating storage medium. The storage medium can thus, for example, be a USB stick, a memory card or a hard disk. The data is encrypted and signed and user data is likewise stored with the encrypted data. As a result, the security of the data storage on the storage medium is unimportant. The data is sufficiently protected against manipulation or unauthorized reading.

Although the data is not transferred over the automation network, this present embodiment likewise represents a method for secure data transfer in an automation network. Here, the path taken by the data transfer is independent of the automation network.

In accordance with the contemplated embodiments of the invention, the encrypted and signed data can be transferred over a cable link between the program invocation and the subassembly. In this case, this can be an insecure cable link, because the data is sufficiently protected against manipulation or unauthorized reading by the encryption, the signing and the simultaneous transfer of the user data.

In accordance with the contemplated embodiments of the invention, the data transfer is effected over the cable link in accordance with one of the following protocols: Multi-Point Interface (MPI), Profibus, Ethernet, Transmission Control Protocol/Internet Protocol (TCP/IP), Profinet, Wireless Local Access Network (WLAN).

In accordance with the disclosed embodiments of the invention, the data contains a symmetrical key for encrypted data transfers from the program invocation to the subassembly. This symmetrical key can be used for future data transfers. The use of a symmetrical key can be advantageous in the case, for example, of a deterministic isochronic automation network. In such an automation network, it is important that data is processed by the subassembly exactly at a certain point in time. In this case, an asymmetric encryption and decryption of the data could take too long. Thus in this case the symmetrical key is transferred—encrypted and signed—to the subassembly with the user data and can be used for subsequent data transfers.

In accordance with the contemplated embodiments of the invention, the data contains a further private subassembly key for encrypted data transfers from the program invocation to the subassembly. The further private subassembly key replaces the previous private subassembly key, so that furthermore a secure data transfer is guaranteed. For security reasons, a private key should be regularly replaced.

It is a further object the invention to provide a control device in an automation network. The control device contains a program invocation and the program invocation has a program invocation rights system. The control device further contains a device for authentication of a user by the program invocation rights system with the help of user data for approving a use of the program invocation by the user, a device for encryption and signing of data by the program invocation, where the data contains the user data, and a way to transfer the data by a transfer medium.

It is also an object of the invention to provide a subassembly in an automation network. The subassembly has a subassembly rights system. The subassembly further has a device for receiving data, a device for decrypting data, a device for authenticating a control device as the sender of the data and device for authentication of a user by the subassembly rights system with the help of the user data for transferring data to the subassembly.

It is a further object of the invention to provide a computer-readable storage medium with instructions which can be executed in a control device in an automation network. The control device contains a program invocation and the program invocation has a program invocation rights system. During execution of the instructions in the control device in the automation network, the instructions prompt the control device to execute the following method. First, a user is authenticated by the program invocation rights system with the help of user data. Data is then encrypted and signed by the program invocation, whereby the data contains the user data. The data is then transferred by a transfer medium.

It is yet another object the invention to provide a computer-readable storage medium with instructions which can be executed in a subassembly in an automation network. The subassembly has a subassembly rights system. During execution of the instructions, the instructions prompt the subassembly to execute the following method. First, data is received and decrypted. A control device is then authenticated and a user is authenticated by the subassembly rights system with the help of the user data.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, embodiments of the invention are explained in greater detail with reference to the drawings, which show:

FIG. 1 is schematic block diagram illustrating an automation network with a program invocation, a transfer channel and a subassembly;

FIG. 2 is a schematic block diagram of an automation network with a program invocation, a subassembly, whereby the transfer of the data occurs with the aid of a storage medium.

DETAILED DESCRIPTION OF THE PREFERRED EMBODIMENTS

Figure 3:
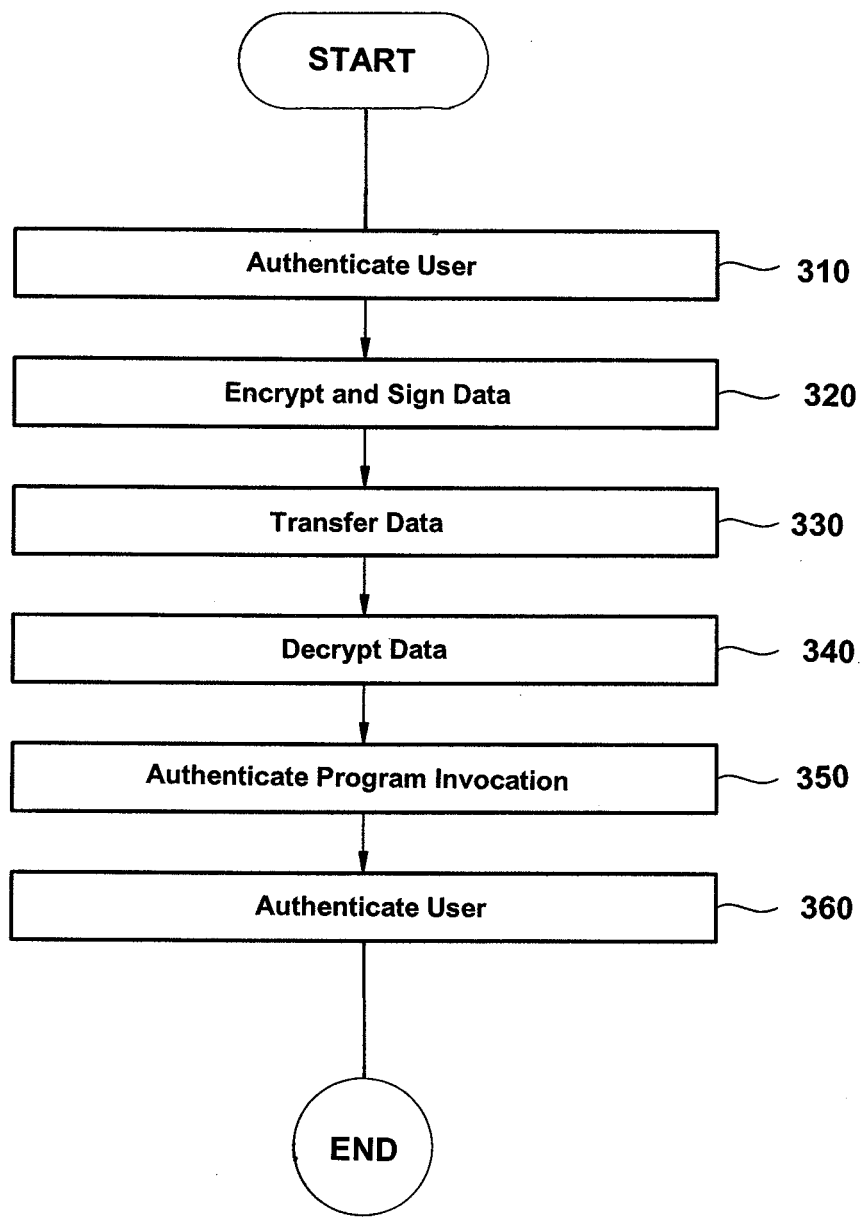
FIG. 3 a flowchart of a method for secure data transfer in an automation network.

Elements of the successive figures which correspond to one another are characterized with the same reference characters.

FIG. 1 is a schematic block diagram of an automation network 100 with a control device 102 and a subassembly 104. The control device 102 has a program invocation 106. The control device 102 and the subassembly 104 are connected by any transfer channel 108. 'Any' in this context means that the transfer channel 108 can also be an insecure transfer channel. In accordance with the invention, a secure data transfer does not rely on the transfer channel. The control device 102 contains an interface 109, as a result of which the control device 102 is connected to the transfer channel 108 and can transfer data over the transfer channel 108 to the subassembly 104. The subassembly 104 contains an interface 111, as a result of which the subassembly 104 is connected to the transfer channel 108 and can receive data over the transfer channel 108 from the control device 102.

The program invocation has a private program invocation key 110. Additionally, the program invocation 106 has a public subassembly key 112. The subassembly 104 has a private subassembly key 116. Additionally, the subassembly has the public program invocation key (not shown). The public keys are thus available to both units. Additionally, each of the units has the respective private key.

The public subassembly key in the program invocation 106 is used for encrypting data before the transfer from the control device 102 to the subassembly 104. The data is additionally signed with the private program invocation key 110 by the program invocation 106. The signature is verified with the public program invocation key in the subassembly 104 after the data transfer and the program invocation 106 is authenticated as the sender of the data. The decryption of the data is effected with the private subassembly key 116.

Prior to the data transfer, user data 118 is input at the control device 102 by a user. This can, for example, be logon data consisting of a user name and a password. The user data 118 is transferred to the program invocation 106. The program invocation 106 transfers the user data 118 with the data to be transferred to the subassembly 104. The data 120 transferred from the program invocation 106 to the subassembly 104 thus contains the user data 118 and configuration data. Configuration data is data used by the program invocation 106 to control the subassembly 104.

FIG. 2 is a schematic block diagram illustrating an automation network 200 with a control device 102 and a subassembly 104. The control device 102 also has a program invocation 106. The program invocation 106 has a private program invocation key 110. Additionally, the program invocation has the public subassembly key. The subassembly 104 has a private subassembly key 116. Additionally, the subassembly 104 has the public program invocation key (not shown). The data transfer in the automation network 200 is effected from the control device 102 to the subassembly 104 by a storage medium 202. This can, for example, be a multimedia card (MMC). First, the data is written to the multimedia card 202. This can be achieved, for example, by a processor 204 of the control device 102 that has access to the multimedia card 202 and can prompt the storage of data on the multimedia card 202. The multimedia card 202 is then inserted into a card reader (not shown) of the subassembly 104, so that a processor 206 of the subassembly 104 has access to the multimedia card 202 and can read the data. The decryption and verification of the data is effected in a similar manner to the method already described in FIG. 1.

The control device 102 additionally has a computer-readable storage medium 208 containing instructions that can prompt the control device to perform the above-described method if the instructions are, for example, executed by the processor 204.

The subassembly 104 likewise has a storage medium 210 containing instructions which, during execution by the processor 206, prompt the subassembly to execute the above-described method.

FIG. 3 is a flowchart of the method in accordance with an embodiment of the invention. A user is authenticated by the program invocation rights system with the help of user data as indicated in step 310. It is thus ensured that the user is authorized to use the program invocation. This is achieved, for example, with a user name and a code word as user data. Data is encrypted and signed by the program invocation, as indicated in step 320. The data contains the user data. The data is transferred by a transfer medium from the program invocation to the subassembly, as indicated in step 330. The transferred data is decrypted in the subassembly, as indicated in step 340. The program invocation is authenticated by the corresponding subassembly as the sender of the data, as indicated in step 350. The user is authenticated by the subassembly rights system with the help of the user data, as indicated in step 360.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for securely controlling an automation network, the automation network comprising at least one control device and at least one subassembly, the control device being utilized to program the subassembly and including a program invocation for programming the subassembly, the program invocation including a program invocation rights system and the subassembly including a subassembly rights system, the method comprising the steps of:
   authenticating a user by the program invocation rights system aided by user data for approving a use of the program invocation by the user;
   encrypting and signing data by the program invocation, the data containing the user data and configuration data which is utilized to control the subassembly;
   transferring the encrypted and signed data by a transfer medium from the program invocation to the subassembly;
   decrypting the data and checking a signature of the data in the subassembly;
   authenticating the program invocation by the subassembly rights system via the signature;
   authenticating the user by the subassembly rights system aided by the user data; and
   processing the configuration data in the subassembly to control the subassembly upon successful authentication of the program invocation and the user.

2. The method as claimed in claim 1, wherein the encryption is an asymmetric encryption.

3. The method as claimed in claim 2, wherein the program invocation and the subassembly each have an asymmetric public subassembly key, wherein the program invocation has a private program invocation key and the subassembly has a private subassembly key, the method further comprising the steps of:
   asymmetrically encrypting the data in the program invocation with the public subassembly key and signing the data with the private program invocation key;
   transferring the encrypted and signed data from the program invocation to the subassembly; and
   decrypting the encrypted data in the subassembly with the private subassembly key and authenticating the program invocation as sender of the data with the public program invocation key.

4. The method as claimed in claim 1, wherein the encrypted and signed data is stored by the program invocation on a storage medium and prior to the decryption in the subassembly is read from the storage medium.

5. The method as claimed in claim 1, wherein the encrypted and signed data is transferred over a cable link between the program invocation and the subassembly.

6. The method as claimed in claim 5, wherein the data transfer is effected over the cable link by one of the following protocols: multi-point interface (MPI), PROFIBUS, Ethernet, Transmission Control Protocol/Internet Protocol (TCP/IP), PROFINET.

7. The method as claimed in claim 5, wherein the data transfer is effected over a wireless link by one of the following protocols: Ethernet, Transmission Control Protocol/Internet Protocol (TCP/IP), PROFINET.

8. The method as claimed in claim 1, wherein the data contains a symmetrical key for encrypted data transfers from the program invocation to the subassembly.

9. The method as claimed in claim 3, wherein the data contains a further private subassembly key and a further public program invocation key for encrypted data transfers from the program invocation to the subassembly.

10. A control device in an automation network for programming a subassembly, the control device containing a program invocation, and the program invocation having a program invocation rights system, the control device comprising:
    an authentication device for authentication of a user by the program invocation rights system with the help of user data for approving a use of the program invocation by the user;
    an encryption and signing device configured to encrypt and sign data by the program invocation, the data containing the user data and configuration data which is utilized to control the subassembly;
    a transfer device configured to transfer the signed and encrypted data by a transfer medium; and
    a processing device for processing the configuration data in the subassembly to control the subassembly upon successful authentication of the program invocation and the user.

11. The control device as claimed in claim 10, wherein the control device is configured to:
    authenticate a user by the program invocation rights system aided by user data for approving a use of the program invocation by the user;
    encrypt and sign data by the program invocation, the data containing the user data; and
    transfer the data by a transfer medium from the program invocation to the subassembly.

12. A subassembly in an automation network, the subassembly including a subassembly having a subassembly rights system, the subassembly comprising:
    a receiver configured to receive data;

a decryption device configured to decrypt data and check a signature of the received data;

a device authenticator configured to authenticate a control device as the sender of the data;

a user authenticator configured to authenticate a user by the subassembly rights system aided by the user data;

wherein the subassembly is controlled by the control device based on configuration data processed in the subassembly upon successful authentication of the control device and the user.

13. The subassembly as claimed in claim 12, wherein the subassembly is configured to:

decrypt the data in the subassembly;

authenticate a program invocation by a corresponding subassembly; and authenticate the user by the subassembly rights system aided by the user data.

14. An automation network comprising:

a control device containing a program invocation, and the program invocation having a program invocation rights system, the control device comprising:

an authentication device for authenticating of a user by the program invocation rights system with the help of user data for approving a use of the program invocation by the user;

an encryption and signing device configured to encrypt and sign data by the program invocation, the data containing the user data;

a transfer device configured to transfer the encrypted and signed data by a transfer medium; and a processing device for processing configuration data; and a subassembly including a subassembly having a subassembly rights system, the subassembly comprising:

a receiver configured to receive data;

a decryption device configured to decrypt and check a signature of the received data;

a device authenticator configured to authenticate a control device as the sender of the data; and a user authenticator configured to authenticate a user by the subassembly rights system aided by the user data;

wherein the control device is configured to transfer data by a transfer medium from the control device to the subassembly;

wherein the subassembly is configured to receive the transferred data; and wherein the subassembly is controlled by the control device based on the configuration data processed in the subassembly upon successful authentication of the program invocation and the user.

15. A non-transitory computer-readable storage medium encoded with instructions which, during execution in a control device in an automation network, the control device being utilized to program the subassembly and including a program invocation for programming the subassembly, and the program invocation having a program invocation rights system, prompt the control device to execute a method comprising:

authenticating a user by the program invocation rights system aided by the user data;

encrypting and signing data by the program invocation, the data containing the user data and configuration data which is utilized to control the subassembly; and transferring the encrypted and signed data by a transfer medium.

16. A non-transitory computer-readable storage medium encoded with instructions which, during execution in a subassembly in an automation network, the subassembly having a subassembly rights system, prompt the subassembly to execute a method comprising:

receiving data;

decrypting the data and checking a signature of the received data;

authenticating a control device as a sender of the data; and authenticating a user by the subassembly rights system aided by the user data;

wherein the subassembly is controlled by the control device based on configuration data processed in the subassembly upon successful authentication of the control device and the user.

17. The computer-readable storage medium as claimed in claim 16, wherein the computer-readable storage medium is configured to:

authenticate a user by the program invocation rights system aided by user data for approving a use of the program invocation by the user;

encrypt and sign data by the program invocation, the data containing the user data;

transfer the data by a transfer medium from the program invocation to the subassembly;

decrypt the data in the subassembly;

authenticate the program invocation by a corresponding subassembly; and authenticate the user by the subassembly rights system aided by the user data.

* * * * *